June 6, 1967 A. M. CREIGHTON, JR., ET AL 3,323,682
DISPOSABLE CARTRIDGE FOR GUN-TYPE DISPENSERS
Filed Oct. 6, 1965
2 Sheets-Sheet 2
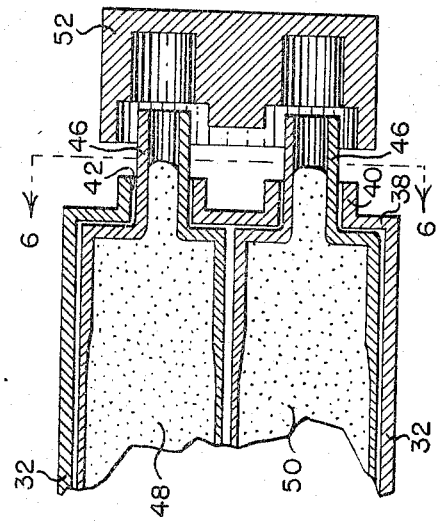
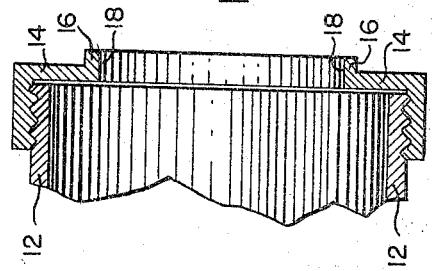
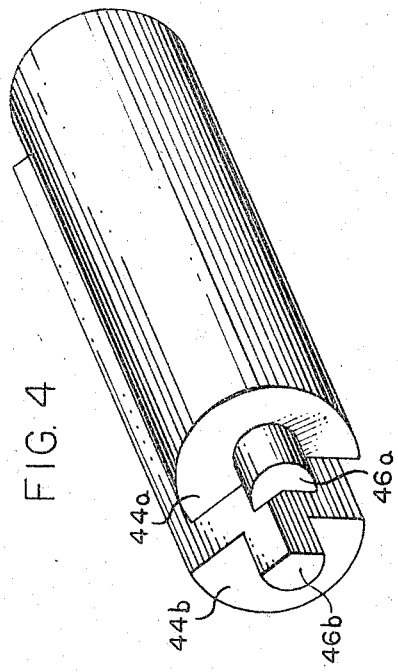
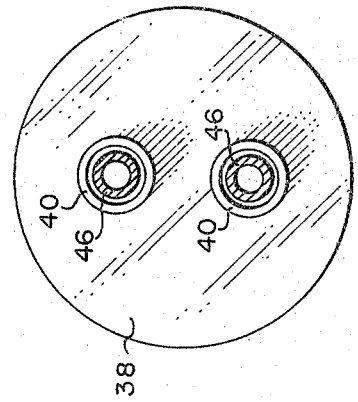
INVENTORS
ALBERT M. CREIGHTON, JR.
WILLIAM D. DEVANEY
BY

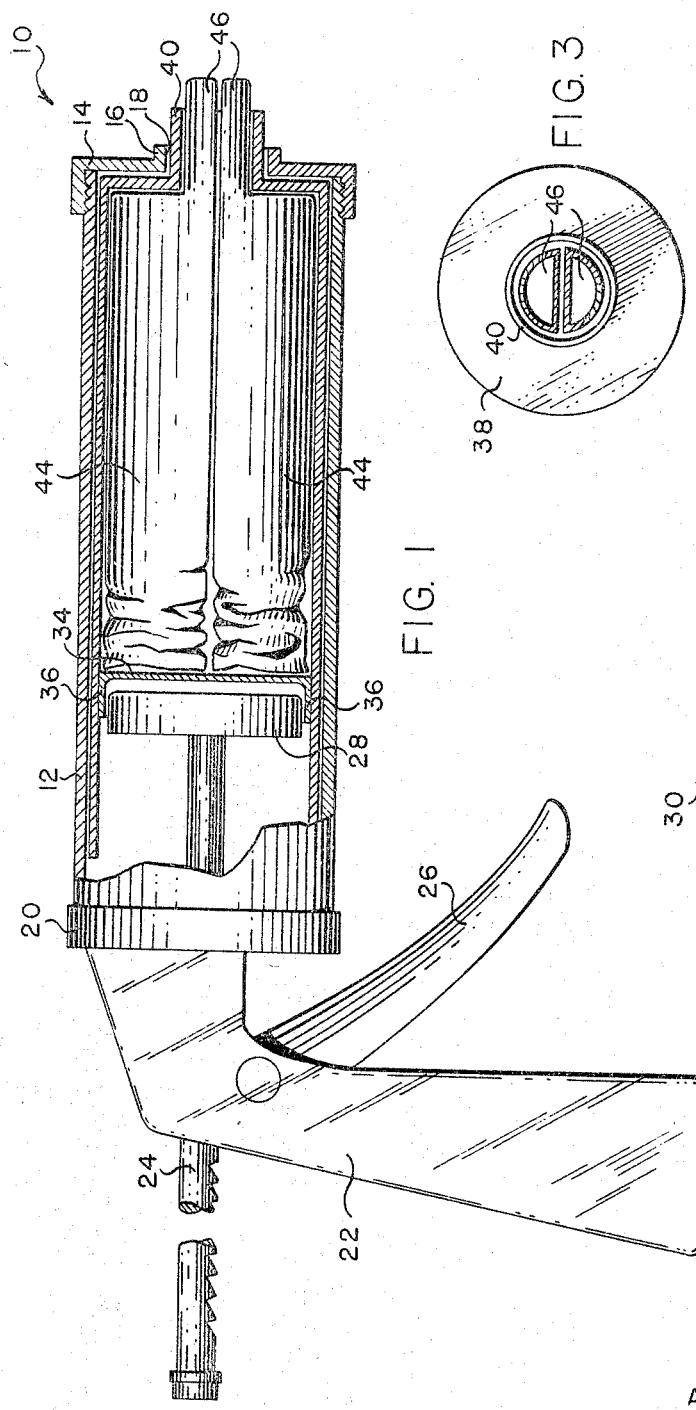
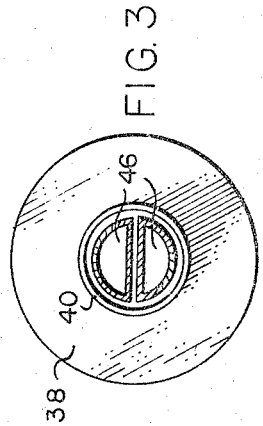
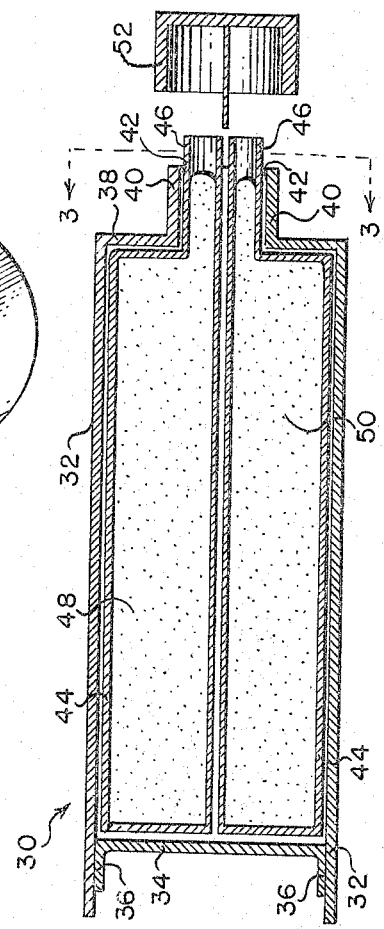

United States Patent Office 3,323,682
Patented June 6, 1967

3,323,682
DISPOSABLE CARTRIDGE FOR GUN-TYPE DISPENSERS
Albert M. Creighton, Jr., Manchester, and William D. Devaney, Methuen, Mass., assignors to Chemical Development Corporation, Danvers, Mass., a corporation of Massachusetts
Filed Oct. 6, 1965, Ser. No. 493,401
7 Claims. (Cl. 222—94)

This invention relates to cartridges for gun-type dispensers and more particularly to a disposable cartridge having a plurality of collapsible tubes contained therein, which when subjected to a uniform pressure, simultaneously dispense proportional amounts of material.

At the present time, adhesives composed of a vehicle and a catalyst, such as, epoxy resins and hardeners, are widely used both in industry and in the home to achieve an extremely strong bond between materials having the same or dissimilar properties. The different chemical formulations and reaction characteristics of the new adhesives have created a number of problems in the areas of storage, handling and use which were not encountered with the older conventional type adhesives. For example, the components of the new adhesives i.e., the particular vehicle and corresponding catalyst, cannot be mixed together until just before the time that they are actually used. If the vehicle and catalyst are accidentally mixed together in advance of their intended use, curing will take place within a relatively short period of tme with the result that the vehicle cannot be used thereafter as an adhesive. However, the accidental mixing of the vehicle and catalyst can be prevented by suitable storage of the two components, usually in separate or divided containers. In addition to requiring physically separate storage prior to mixing, the new adhesives also impose a further requirement that the vehicle and catalyst must be mixed together in proper proportional amounts within relatively strict tolerances in order to achieve their maximum inherent bonding strength.

Various devices have been employed to fulfill the dual requirements of separate storage and proportional discharge and/or mixing of the adhesive vehicle and catalyst. Representative examples of such devices are shown in United States Patent Nos. 3,029,983 of Wagenhals and 3,105,615 of Koga. Both patents disclose the so called "toothpaste" type containers which are simultaneously squeezed to dispense predetermined amounts of different materials e.g., an adhesive vehicle and catalyst. The Wagenhals' device utilizes a dispenser having two separate tubes which are simultaneously squeezed by a roller mechanism while in Koga, the "toothpaste" type tubes are rolled either by a squeeze handle or by a key. Although both devices are able to dispense proportional amounts of materials including epoxy resins and hardeners, their use is confined primarily to the home handyman or occasional user because of their particular design and structure. Neither device, for example, is practical for industrial applications because of the limited container size imposed by the hand operated squeezing mechanism of Wagenhals and the hand operated wind-up unit of Koga. Furthermore, the "toothpaste" type containers of both devices are restricted to a special and specifically designed squeezing mechanism and cannot be used in conventional dispensers such as, the ubiquitous "caulking" gun dispenser.

It is accordingly a general object of the present invention to provide a disposable, plural chambered cartridge for use in gun-type dispensers.

It is a specific object of the present invention to provide a plurality of collapsible tubes within a disposable cartridge, which, when subjected to a uniform pressure, will simultaneously dispense predetermined proportional amounts of the materials contained therein.

It is still another object of the invention to provide pressure actuated means for uniformly collapsing the cartridge tubes.

It is a feature of the invention that the materials contained in the cartridge tubes can be ejected therefrom in physically, separated, independent streams or in independent streams which are in intimate physical contact.

It is a further object of the invention to provide collapsible cartridge tubes that can be filled individually and interchanged to vary the proportional amounts of the dispensed materials.

These objects and other objects and features of the present invention will be apparent from the following description of a preferred embodiment thereof, selected for purposes of illustration, and, shown in the accompanying drawings in which:

FIG. 1 is a view in side elevation and partial section of a conventional gun-type dispenser containing a plural chambered, disposable cartridge constructed in accordance with the present invention;

FIG. 2 is a view in cross-section of a preferred embodiment of the disposable cartridge showing two collapsible, viscous substance filled tubes positioned therein together with a frictionally engaged sealing cap;

FIG. 3 is a view in cross-section taken along line 3—3 in FIG. 2 showing the collapsible tube dispenser spouts;

FIG. 4 is a view in perspective of a modification of the collapsible tubes shown in FIGS. 1 and 2 which provide variable metering ratios;

FIG. 5 is a view in cross-section of an alternative embodiment of the dispenser spouts showing a press fitted closure cap partially placed thereon;

FIG. 6 is a view in cross-section taken along line 6—6 in FIG. 5 showing the alternative arrangement of the dispensing spouts; and FIG. 7 is a view in cross-section of a gun-type dispenser end cap for use with the cartridge shown in FIG. 5.

Turning now to the drawings and particularly to FIGURE 1 thereof, there is shown in side elevation and in partial section a typical "caulking" gun-type dispenser indicated generally by the reference numeral 10. Since gun dispensers of the type depicted in FIGURE 1 are well known to those skilled in the art and since the particular dispenser 10 does not per se form a part of the present invention, the following general description of the dispenser will be sufficient for purposes of understanding the present invention.

The major components of the gun dispenser 10 are illustrated in FIGURE 1 and comprise a cylindrical barrel 12 which is threaded at one end to receive in threaded engagement a circular nozzle end cap 14 having an integrally formed annular shoulder 16 whose inner walls 18 define a corresponding circular access port to the interior of gun barrel 12. Threadably secured to the other end of barrel 12 is a plunger end cap 20 on which is mounted a conventionally shaped handle 22. The handle 22 contains an operating mechanism (not shown) which incrementally advances a rachet actuated plunger 24 along the longitudinal axis of gun barrel 12 each time trigger 26 is squeezed by the operator. An annular piston 28 is secured to the forward end of plunger 24. For purposes of illustration, the piston 28 has been depicted with substantially straight and rigid sides. However, it should be understood that relatively flexible, relief type pistons can be used to provide a slight back pressure upon the release of trigger 26. The slight back pressure will effectively stop any further flow of materials from the gun dispenser. In addition, other well known modifications and alternative structural configurations can be employed in the gun dispenser including for example, but without limitation, an open gun barrel and an air operated piston.

Having identified and briefly discussed the major components of the conventional "caulking" gun dispenser 10, we will now describe in detail the disposable, plural chambered cartridge of our invention. Referring generally to FIGURES 1 through 3, and specifically to FIGURE 2, there is shown a disposable cartridge constructed in accordance with the present invention and identified generally by the reference numeral 30.

The cartridge 30 comprises an exterior shell 32 that substantially conforms both in size and shape to the interior dimensions and configuration of the gun barrel 12. Since the disposable cartridge of the present invention can be used with certain obvious modifications as to size and shape, in any conventional gun-type dispenser, it should be understood that the shell 32 depicted in FIGURES 1 through 3 is merely illustrative, and that the invention is not limited to the exact configuration shown therein.

The exterior shell 32 can be fabricated from a number of suitable materials, such as, heavy cardboard, plastic or metal. Preferably, the selected material for the exterior shell 32 should have sufficient rigidity when formed into a cylindrical shape to provide adequate protection for the contents of the shell against punctures, compression and other damage. We have found that a relatively heavy cardboard when rolled into a cylinder produces an excellent exterior shell 32.

The left hand end of the exterior shell 32, as viewed in FIGURES 1 and 2, is fitted with a circular plug 34, having an integrally fabricated shoulder 36 that forms an annular receptacle for the gun piston 28. The inside diameter of shoulder 36 is slightly greater than the diameter of piston 28 while the outside diameter of the shoulder is in turn slightly less than the inside diameter of the exterior shell 32. This size relationship permits the piston and plug to slidably advance as a unit along the longitudinal axis of the cartridge during the dispensing operation.

The right hand end of the exterior shell 32 is partially closed by an end piece 38 that can be integrally fabricated with the shell 32, as shown in FIGURE 2, or constructed as a separate unit which is attached to the cylindrical shell. Regardless of the particular form of construction that may be used, the end piece 38 is provided with an outwardly extending, circular shoulder 40 whose inner walls 42 define an annular opening to the interior of shell 32. The outside diameter of shoulder 40 is designed to be slightly less than the inside diameter of the gun dispenser end cap shoulder 16 in order to permit the cartridge shell to fit within and extend outwardly from the nozzle end cap 14 as shown in FIGURE 1.

Positioned within and occupying substantially the entire interior portion of the cartridge shell 32, are two collapsible, dispensable ingredient filled tubes 44 which each terminate at one end in an initially closed dispensing spout 46. The tubes 44 are first filled with dispensable ingredients 48 and 50 which may be viscous substances, such as, an epoxy resin and hardener, and then sealed to provide an airtight container for the ingredients. After filling and sealing both tubes, the assembly of the disposable cartridge 30 is completed by inserting the slidable end plug 34 in shell 32. It should be noted that for purposes of clarity, the cartridge tubes 44 have not been depicted in physical contact with each or with the inside walls of the shell 32. However, in actuality these components are in abutting relation.

Looking at FIGURES 1 through 3, it can be seen that each tube 44 is right semi-cylinder and that both tubes have the same transverse, cross-sectional area and shape. A similar size and shape relationship also exists between the two dispensing spouts 46. With this configuration, it will be apparent that a metering ratio of 1:1 will be obtained if both tubes are simultaneously subjected to a uniform pressure such as that exerted by piston 38 as shown in FIGURE 1. Other metering ratios can be achieved by changing the transverse, cross-sectional area of the two tubes. One method of accomplishing this is shown in FIGURE 4 which illustrates an alternative embodiment of the dispensable ingredient filled tubes 44.

Referring to FIGURE 4, it can be seen that the transverse, cross-sectional areas of the two tubes have been altered by changing the transverse, cross-sectional shapes of the tubes from equal area semicircles (FIGURES 2 and 3) to unequal area pie-shaped configurations. For example, in tube 44a, the arcuate portion of the "pie" exceeds 180 degrees while in tube 44b the corresponding arcuate portion is less than 180 degrees. Expressed in slightly different terms, if the arcuate length of tube 44b is $n$ degrees, the arcuate length of tube 44a will be $360° - n$. The same cross-sectional shape and size relationship also holds for the corresponding dispensing spouts 46a and 46b. Thus, it is possible to obtain a wide range of metering ratios merely by varying the arcuate length of the pie-shaped cross-sectional configuration of the two collapsible tubes 44.

It will be appreciated from an inspection of FIGURE 1 that the tubes 44 are uniformly collapsed by the pressure of piston 38 against the cartridge plug 34. It is a feature of the invention that the uniform pressure exerted on the collapsible tubes 44 produces an accurately metered extrusion of the viscous substances from the dispensing spouts 46. In order to obtain the desired uniform collapsing of tubes 44 without rupturing, the tubes are fabricated from a strong yet flexible material, such as for example, plastic or rubber. In the preferred embodiment shown in the drawings, the tubes 44 are constructed from a thin, but firm plastic film that is impervious to the ingredients 48 and 50. In addition to providing the necessary strength and flexibility, the use of a plastic film also simplifies the fabrication and loading of the tubes because the ends of the tubes can be rapidly and easily closed by means of heat sealing.

It should also be noted that the preferred, heat sealed plastic film construction provides an airtight container for the ingredients that greatly extends the shelf-life of the cartridge 30. Of course, once the ends of the dispensing spouts 46 have been cut off, as shown in FIGURES 1 through 3, the tubes must be temporarily sealed after each dispensing operation. For this purpose, it is contemplated that the cartridge will be marketed with a press-fitted sealing cap 52 which performs the dual functions of sealing both substances from the atmosphere while at the same time separating the substances from each other thereby preventing a premature curing of the epoxy resin.

It has already been mentioned that one of the objects of the invention is to provide a disposable, plural chambered cartridge that will dispense either parallel abutting or parallel, spaced streams of the ingredients contained in the cartridge. The former extrusion pattern is produced by the dispensing spouts shown in FIGURES 2, 3 and 4 while the latter configuration is obtained by the dispensing spout arrangement depicted in FIGURES 5 and 6. In the later figures, the two dispensing spouts 46 are physically separated from each other by an amount which corresponds to the desired stream separation distance.

The change in relative location of the dispensing spouts in the alternative embodiment depicted in FIGURES 5 and 6, dictates that a corresponding change be made in the sealing cap 52 (FIGURE 5) and in the gun barrel end cap 14 (FIGURE 7). The inside diameter of the end cap shoulder 16 has been increased to accept the larger size of the cartridge shell shoulder 40 while the sealing cap 52 has been modified to receive the two spaced dispensing spouts 46.

It may be advantageous in some circumstances to reinforce the dispensing spouts 46 and the forward ends of the tubes 44 to eliminate the possibility of any slight collapse or buckling of the tubes which would tend to restrict the exit of the viscous substances. The desired degree of reinforcement can be easily achieved by increasing the thickness of the tubular walls and the dispensing spouts as shown in FIGURE 5. This construction, of course, can be employed in connection with the embodiment depicted in FIGURES 1 through 4 to achieve the same results.

Although the preferred embodiments of our invention have been described herein and shown in the drawings as having two containers 44, it should be understood that more than two containers can be employed without departing from the scope of the invention. Thus, for example, three "pie-shaped" containers each having an arcuate length of 120° can be fitted within the exterior shell 32 to form the cartridge 30.

Having described in detail the disposable, plural chambered cartridge of our invention, it will now be apparent to those skilled in the art that numerous modifications and changes can be made to the invention without departing from the invention as defined in the appended claims.

What we claim and desire to secure by Letters Patent is:

1. A disposable cartridge for use in gun-type dispensers comprising: an open ended exterior shell which substantially conforms in size and shape to the interior dimensions and configuration of said dispenser; a pressure actuated plug fitted in one end of said shell for slidable movement along the longitudinal axis thereof; and, a plurality of collapsible, dispensible ingredient filled tubes positioned within said shell, said tubes each having one end in abutting relation to said pressure actuated plug and the other end terminating in outlet means for discharging said ingredients.

2. The cartridge of claim 1 wherein said outlet means comprises an integrally fabricated dispensing spout fluidly connected to the interior of said tube.

3. A disposable cartridge for use in a gun-type dispenser comprising: an open ended exterior shell which substantially conforms in size and shape to the interior dimensions and configuration of said dispenser; a pressure actuated plug fitted in one end of said shell for slidable movement along the longitudinal axis thereof; and a plurality of collapsible, dispensable ingredient filled tubes of predetermined cross-sectional area positioned within said shell and occupying substantially the entire interior thereof, said tubes each having one end in abutting relation to said pressure actuated plug and the other end terminating in a dispensing spout for said ingredients.

4. The cartridge of claim 3 further characterized by said tubes and dispensing spouts having a semi-cylindrical shape.

5. The cartridge of claim 4 further characterized by the longitudinal flat portion of said semi-cylindrical tubes and dispensing spouts being in abutting relation to each other.

6. The cartridge of claim 3 further characterized by said tubes and dispensing spouts having a preshaped, transverse, cross-sectional configuration with one of said tubes and the corresponding dispensing spout having an arcuate portion greater than 180 degrees and the other tube and corresponding dispensing spout having an arcuate portion less than 180 degrees.

7. The cartridge of claim 6 further characterized by the combined length of said arcuate portions being 360 degrees.

References Cited

UNITED STATES PATENTS

| | | | |
|---|---|---|---|
| 1,965,271 | 7/1934 | Wharton | 222—95 |
| 2,722,218 | 11/1955 | Mittleman | 222—95 X |
| 2,833,444 | 5/1958 | Sherbondy | 222—95 |
| 3,029,983 | 4/1962 | Wagenhals | 222—100 X |
| 3,105,615 | 10/1963 | Koga | 222—94 |
| 3,159,312 | 12/1964 | Van Sciver | 222—137 |
| 3,197,071 | 7/1965 | Kuster | 222—94 |
| 3,206,074 | 9/1965 | Hoffmann | 222—105 X |

RAPHAEL M. LUPO, *Primary Examiner.*